Jan. 30, 1934.  J. E. ROSS  1,944,951

CAP FOR TIRE VALVE TUBES

Filed Sept. 1, 1932

INVENTOR,
Justin E. Ross.
BY
Hovey E. Hamilton,
ATTORNEYS.

Patented Jan. 30, 1934

1,944,951

UNITED STATES PATENT OFFICE 1,944,951

CAP FOR TIRE VALVE TUBES

Justin E. Ross, Kansas City, Mo.

Application September 1, 1932. Serial No. 631,307

6 Claims. (Cl. 152—12)

This invention relates to a cap for valve tubes and especially to a cap suitable for use on the well known valve tube for pneumatic tires commonly used on vehicle wheels.

It is a fact that the threaded caps now in general use for this purpose are easily detached from their position on the tubes, thus resulting in a loss of a large number of caps and the exposing of the valve parts to foreign particles which ofttimes causes the valve to leak. Furthermore, these open tire valve tubes become clogged with dirt which interferes with the proper setting of the valve after the filling operation. Moreover, the present valve tube caps are so constructed that a considerable time is required to remove and replace the same. Also, the threads on the tube become defective, thus making it very difficult to screw the cap to position. Due to these facts, the station attendant or the car operator in a large number of cases neglects to replace the caps after the filling operation. It is to overcome these objectionable features that the present cap is designed.

The principal object of this invention is the provision of a cap for tire valve tubes having its body portion made of a resilient material provided with a cylindrical bore extending partially therethrough, whereby the cap may be easily and quickly positioned on the valve tube and securely held thereon.

A further object of the invention is the production of a cap having a body of resilient material and a flanged metal member partially embedded therein with its outer end shaped to be fitted into the valve tube to engage the threaded valve sleeve for removing the valve.

Other objects of the invention are economy in manufacture, ease and efficiency of operation, and adaptability to tubes of various outside contours. Minor objects will appear during the course of the specification, wherein reference is had to the drawing, in which.

Figure 1:
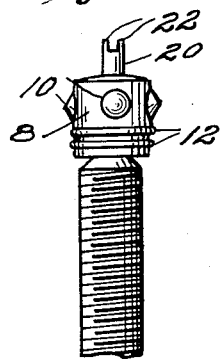
Figure 1 is an elevation of a tire valve tube having a cap embodying this invention operatively positioned thereon.
Figure 3:
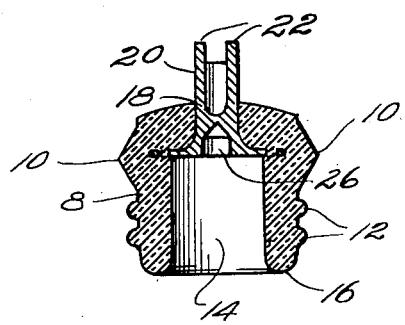
Fig. 3 is a vertical, sectional view taken on line III—III of Fig. 2.
Figure 2:
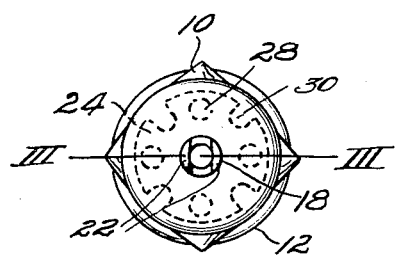
Fig. 2 is an enlarged, plan view of the cap.

Like reference characters designate similar parts throughout the several views, and the numeral 8 indicates the cap body made of a resilient material such as soft rubber, the outer surface of which is preferably of substantially cylindrical form. However, the outer contour may be varied to present any desired design.

Figure 4:
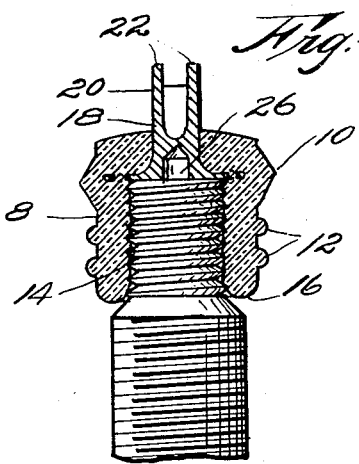
Fig. 4 is a view similar to that shown in Fig. 3, in position on the valve tube.
Figure 6:
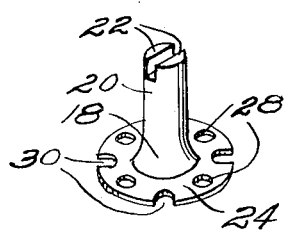
Fig. 6 is a perspective view of the rigid, flanged insert.
Figure 5:
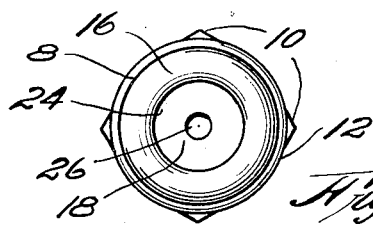
Fig. 5 is an inverted plan view of the cap.

For purposes hereinafter set forth, a series of bosses 10 are formed adjacent the upper portion of the cap body, while the lower portion thereof has annular beads 12. Axially formed in the cap body is a cavity or bore 14, which is substantially cylindrical in shape, with the cylindrical wall thereof relatively smooth. This bore extends partially through the cap body and is of sufficient depth to insure the proper positioning of the cap on the valve tube, as shown in Fig. 4. The diameter of this bore is slightly smaller than the outer diameter of the threads on the outer end of the valve tube, thus making it necessary when placing the tube in the operative position to exert a slight pressure, thereby forcing the tube over the threads so that that portion of the rubber adjacent the inner wall will slightly embed itself in the tube thread. This interlocking of the resilient cap body with the threads of the tube insures proper sealing of the tube and also precludes any accidental displacement of the cap when the vehicle is in operation.

While it is a fact that when the vehicle is driven at a high rate of speed the centrifugal force will tend to hold the cap against displacement, yet there are times when this force would not preclude the dropping of the cap by gravity, were it not for the interlocking of the parts, as stated above. The bore end of the cap body is preferably rounded at its periphery as at 16, thus presenting a flared mouth to facilitate proper positioning of the cap on the tube.

Partially embedded in resilient cap body 8 is a relatively rigid, flanged insert 18, having a stem 20 of a diameter slightly smaller than the diameter of the valve tube and adapted to be inserted therein a sufficient distance so that the forked end 22 thereof may engage notches in the valve sleeve, not shown.

This operation is for the removal or replacing of the valve core which is old in the art. The stem 20 is hollowed out a sufficient distance so that during the removal of the valve core no interference will be had with the valve stem. The inner end of insert 18 is provided with an annular flange 24 which preferably extends into the cap body beyond the outer periphery of the cylindrical bore and serves as the inner end wall of said bore. To insure sufficient clearance for the valve stem that might protrude slightly from the valve tube, a recess 26 is formed centrally in the flanged end of insert 18. This recess also serves to receive a trunnion on the mold when the cap is in the process of vulcanizing or manufacturing. In order to preclude any possible chance of relative rotation of the insert and cap body, openings 28 are formed through the outer portion of flange 24, thus permitting a binder of the resilient material to extend therethrough. Also, the outer periphery of the flange is notched as at 30.

During the operation of removing or replacing the valve core, the operator engages the cap body which has been roughened by the use of bosses 10, which presents a good gripping surface; also, when considerable force is exerted on the forked end of the insert, no substantial relative movement can be had between the cap and insert.

Due to the presence of bosses on the surface of the cap it will not roll about when laid on a smooth surface.

However, a slight flexing of the soft rubber body will prevent a too severe action on the valve core parts. Due to the elasticity and resiliency of the body portion, it is apparent that the cap may be easily pressed to the operative position or removed therefrom without detriment to the inner wall thereof. In other words, the body material may be slightly distended to conform to any normal irregularity that might be present at the outer end of the valve tube and will effectually seal the same. Due to the resiliency of this cap it cannot be easily damaged, as is the case with the ordinary screw threaded metal cap now in use.

Having thus described the invention, what is claimed as new and desired to be secured by Letters Patent is:

1. In a cap for tire valve tubes, a resilient body member having a cylindrical bore formed therein; and a metal, flanged insert embedded in said body portion with one end thereof extending outwardly therefrom and its inner end serving as an end wall for said bore.

2. A cap for tire valve tubes comprising a resilient body member; a rigid insert carried by and partially embedded in said body member; and a substantially cylindrical bore formed in said body member and extending to said rigid insert.

3. A cap for tire valve tubes comprising a substantially cylindrical, resilient body member; a flanged, rigid insert partially embedded in said body member; and a cylindrical bore formed in said body member and extending to said insert.

4. A cap for tire valve tubes comprising a substantially cylindrical, resilient body member having bosses on its outer curved surface; a cylindrical bore concentric with said body member and extending partially therethrough; and a rigid, flanged insert embedded in said body member with its flanged portion extending into said body member to form an end wall for said bore, and with its other end protruding from said body member.

5. A cap for tire valve tubes comprising a substantially cylindrical, resilient body member having bosses on its outer curved surface; a cylindrical bore concentric with said body member and extending partially therethrough; and a rigid cylindrical insert having a flange at its one end, axially embedded in said body member with its flanged portion extending into said body member to form an end wall for said bore, and with its other end protruding from said body member.

6. A cap for tire valve tubes comprising a substantially cylindrical, resilient body member having bosses on its outer curved surface; a cylindrical bore concentric with said body member and extending partially therethrough; and a rigid, flanged insert embedded in said body member with its flanged portion extending into said body member to form an end wall for said bore, and with its other end protruding from said body member, and openings formed through said flange.

JUSTIN E. ROSS.